United States Patent
Madjar et al.

(10) Patent No.: US 6,811,922 B2
(45) Date of Patent: Nov. 2, 2004

(54) BATTERY PACK

(75) Inventors: Silvester Madjar, Strongsville, OH (US); Thomas Shea, Colchester, VT (US); Lawrence Sinkewich, Wadsworth, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 273 days.

(21) Appl. No.: 10/120,912

(22) Filed: Apr. 11, 2002

(65) Prior Publication Data

US 2003/0193315 A1 Oct. 16, 2003

(51) Int. Cl.[7] .......................... H01M 2/10; H01M 6/42
(52) U.S. Cl. ........................ 429/99; 429/96; 429/159
(58) Field of Search .............................. 429/96, 99, 159

(56) References Cited

U.S. PATENT DOCUMENTS

| | | | |
|---|---|---|---|
| 4,576,880 A | * 3/1986 | Verdier et al. .............. 429/99 |
| 4,965,148 A | 10/1990 | Daio et al. | |
| 5,709,963 A | 1/1998 | Sim | |
| 5,744,260 A | 4/1998 | Sim | |
| D408,351 S | 4/1999 | Shim | |
| D409,559 S | 5/1999 | Shim | |
| D409,560 S | 5/1999 | Shim | |
| 6,014,009 A | * 1/2000 | Wierzbicki et al. .......... 320/107 |
| 6,218,042 B1 | 4/2001 | Naudet et al. | |
| 6,440,601 B1 | 8/2002 | Aoi et al. | |
| 6,594,886 B2 | * 7/2003 | Osaki et al. ................ 29/623 |

FOREIGN PATENT DOCUMENTS

| | | | | |
|---|---|---|---|---|
| JP | 57090868 A | * | 6/1982 | ............ H01M/4/58 |
| WO | WO 00/46865 A | * | 8/2000 | ............ H01M/2/10 |

* cited by examiner

*Primary Examiner*—Gregg Cantelmo
(74) *Attorney, Agent, or Firm*—Russell H. Toye, Jr.

(57) ABSTRACT

A battery pack is disclosed that includes a battery receiving frame. The frame is a single integral piece comprising two end cap portions and two spine portions, and is preferably molded from a flexible thermoplastic. One of the two spines has a free end, allowing that spine to be flexed so as to create an opening for insertion of electrochemical cells into the frame. The pack optionally includes the application of a label to portions of the frame and cells. The battery pack frame is molded from a thermoplastic resin material. Preferably, the material is a mixture of a polyolefin matrix comprising more than 30 weight percent of the thermoplastic material and an aromatic polymer having a repeating unit that comprises at least one aromatic functional group. In the preferred embodiment, the polyolefin is a polypropylene and the aromatic polymer is a poly(phenylene oxide).

21 Claims, 3 Drawing Sheets

US 6,811,922 B2

BATTERY PACK

BACKGROUND OF THE INVENTION

The present invention generally relates to a battery pack, and more particularly relates to a battery pack for containing electrochemical cells.

Battery packs containing electrochemical cells are in widespread use with a wide variety of portable electronic devices. Packs are utilized for a variety of reasons, including but not limited to, the ease and efficiency of providing a series or a parallel connection for the cells as part of the pack, depending on the voltage provided by each cell and the power requirements of the device, thereby obviating the need for the device to provide the appropriate cell-to-cell contacts for accepting individual cells.

Battery packs are typically made by joining one or more component pieces together. Such pack components can include cell receiving sections, one or more end caps and one or more terminals for making electrical connection between the cells and the device. The components may be welded together, adhesively joined together or snap fit together at some point in the manufacturing process. Additionally, some packs may include an external adhesive label that provides a surface for conveying desired information concerning the pack and can also serve to hold the cells and the various structural pack components together in a single cohesive unit. Such packs are disclosed, for example, in U.S. Pat. No. 5,744,260, U.S. Pat. No. 4,965,148 and U.S. Pat. No. 6,218,042.

These packs present certain disadvantages. The required joining together of the structural pack components increases the potential for disassembly of the pack during labeling and other handling. Further, the number of structural pack components complicates the manufacturing and assembly processes.

There is therefor a need for a pack that minimizes the number of component parts while maintaining sufficient structural integrity to protect the appropriate cell-to-cell contacts within the pack and provide a cohesive unit.

SUMMARY OF THE INVENTION

Accordingly, it is an aspect of the present invention to provide a battery pack comprising a battery pack frame. The battery pack frame is a single integral part. The frame comprises first and second endcap portions and first and second spine portions. One of the spine portions has a free end, allowing the spine to be flexed so as to provide an opening. The opening provided by the flexing of the spine preferably enables a cell assembly to be inserted into the frame, where a cell assembly comprises at least two cells and a cell-to-cell connection that provides either a series or a parallel connection between the cells. The flexing spine preferably has a length of at least fifty percent of the total length of the frame, thereby providing added support to the frame while still allowing for insertion of a cell assembly into the frame.

The pack enables the use of the external cell contacts to provide an electrical connection directly to the device contacts, obviating the need for the pack to include discrete external terminals. In one embodiment of the battery pack of the within invention, the pack comprises two 1.5 volt standard sized AA cylindrical cells employing a lithium nonaqeuous cell chemistry. In this embodiment, the cells are connected in series by a simple nickel tab to create a 3.0 volt cell assembly. The untabbed positive terminal of one cell and the untabbed negative terminal of the second cell are accessible through one or more openings in an endcap portion and make electrical contact directly with the device terminals, thereby avoiding the complex additional tabbing required where 3.0 volt cells are connected in parallel.

These and other features, advantages, and objects of the present invention will be further understood and appreciated by those skilled in the art by reference to the following specification, claims, and appended drawings.

DETAILED DESCRIPTION OF THE PREFERRED EMBODIMENT

Figure 1:
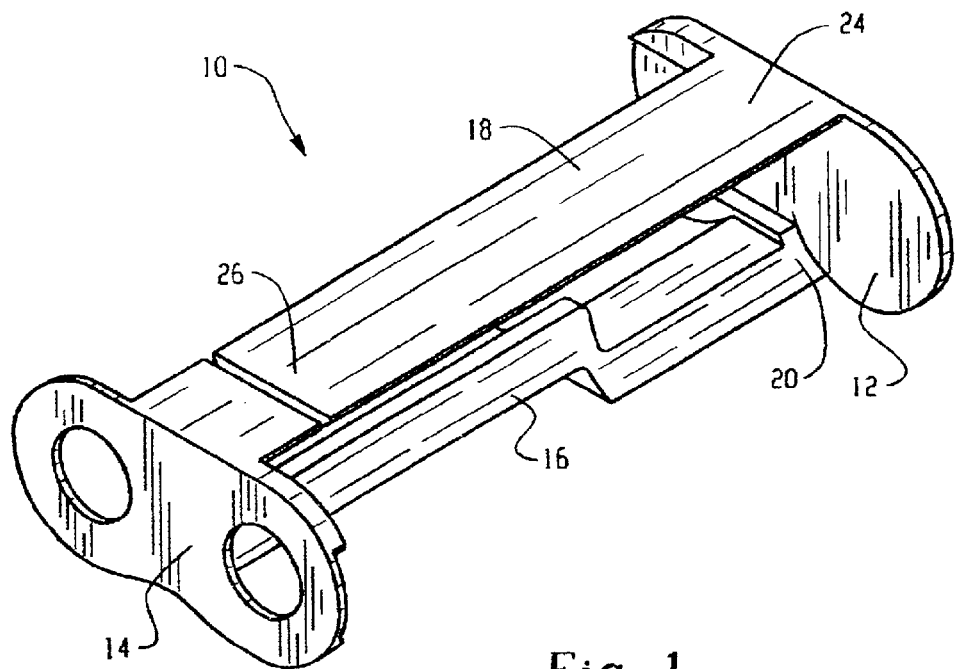
FIG. 1 is a perspective view of a frame of a battery pack according to the present invention.
Figure 2:
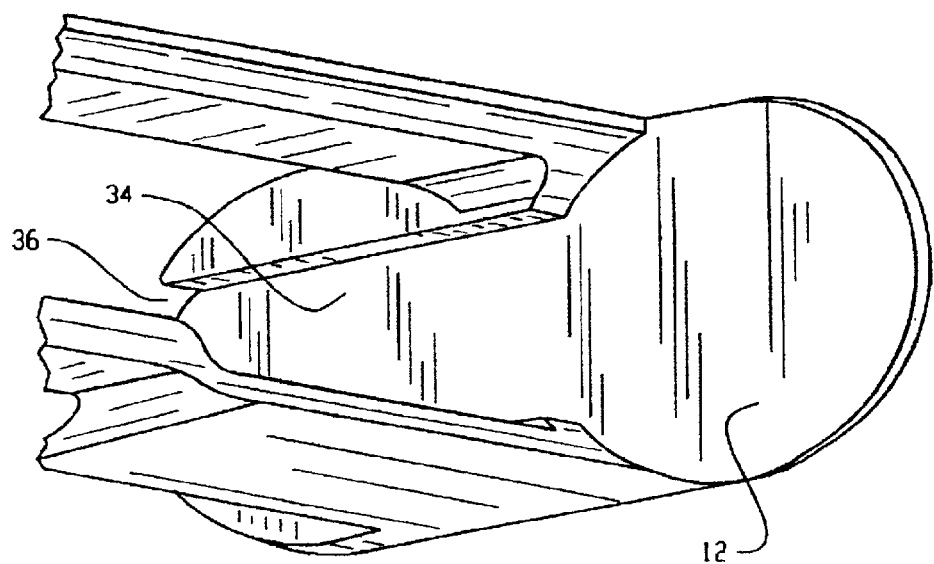
FIG. 2 is a perspective view of one end of the battery pack frame of FIG. 1.
Figure 3:
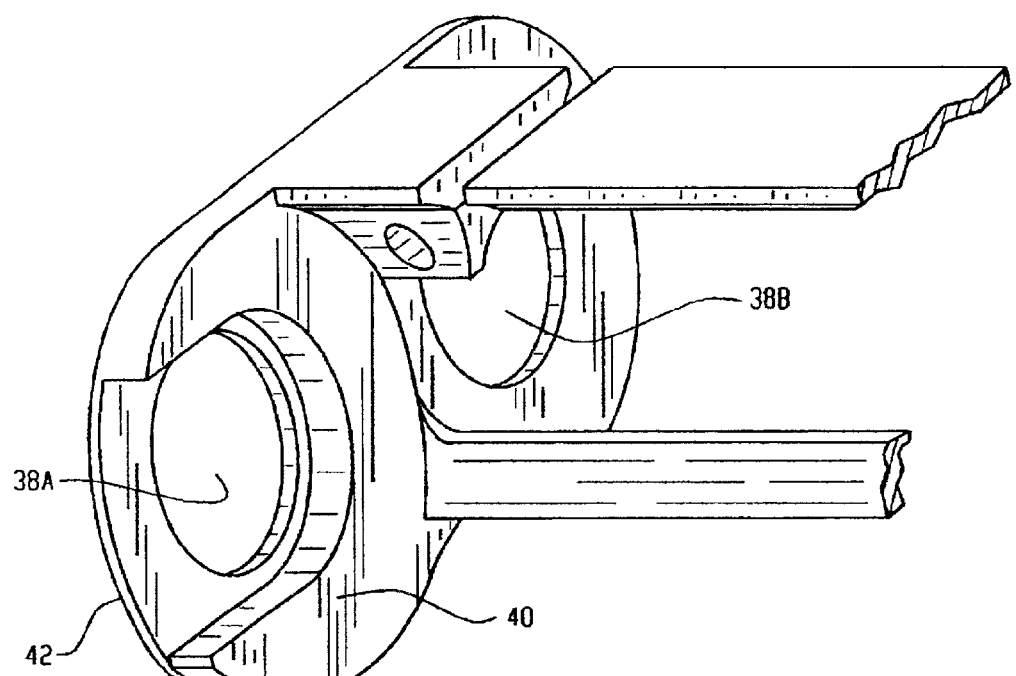
FIG. 3 is a perspective view of an opposing end of the battery pack frame of FIG. 1.

An embodiment of a battery pack frame constructed in accordance with the present invention is illustrated in FIGS. 1 through 4. The battery pack frame 10 includes a first endcap portion 12, a second endcap portion 14, a first spine portion 16 and a second spine portion 18. The frame 10 is designed to accommodate and position at least, and preferably, two cylindrical electrochemical cells arranged in two parallel rows within cell receiving areas. Cell receiving areas extend between the two endcap portions 12, 14. It should be appreciated, that the number of cells provided in the frame 10 of the battery pack is not critical and the frame may include less than a full complement of cells when more cells are not necessary for a given application. A battery pack according to the within invention comprises the frame 10, cells, and any optionally associated label.

The battery pack frame 10 is preferably molded from a thermoplastic resin to form a single flexible part. The first spine portion 16 has a length extending between first endcap portion 12 and second endcap portion 14. The first spine portion 16 has a first end 20 connected to the first endcap portion 12 and a second end 22 connected to the second endcap portion 14. The first spine portion 16 provides one or more external surfaces that cooperate with one or more surfaces of the battery pack compartment of a battery powered device. The first spine portion 16 optionally includes two sections 16A and 16B of differing elevations, to accommodate battery pack guides provided in the pack compartment of a device. It will be appreciated that the shape and configuration of these guides may vary from device to device, thus requiring the corresponding configuration of the first spine portion 16 to vary accordingly. Such variations in the shape of the first spine portion will not depart from the scope of the within invention. Further, the width of the first spine portion 16 is not critical and may vary according to the particular requirements of the battery pack, the configuration of the pack compartment of a particular device and associated efforts to minimize the use of materials.

The second spine portion 18 has a first end 24 connected to the first endcap portion 12 and a second end 26 that is free. The free second end 26 allows the second spine portion 18 to be flexed toward or away from the first spine portion 16, thereby creating an opening. Optionally, an opening can also be created by flexing second endcap portion 14 away from the interior of the frame 10. In the preferred embodiment, two cells are connected by a tab to form a cell assembly prior to insertion into frame 10, and the opening created by flexing spine portion 18 accommodates this cell assembly and allows for insertion of such an assembly into the frame. Optionally, discrete cells can be inserted into the frame 10 through an opening created by flexing the spine portion 18 or by flexing second endcap portion 14 or through other openings available in the frame.

Figure 4:
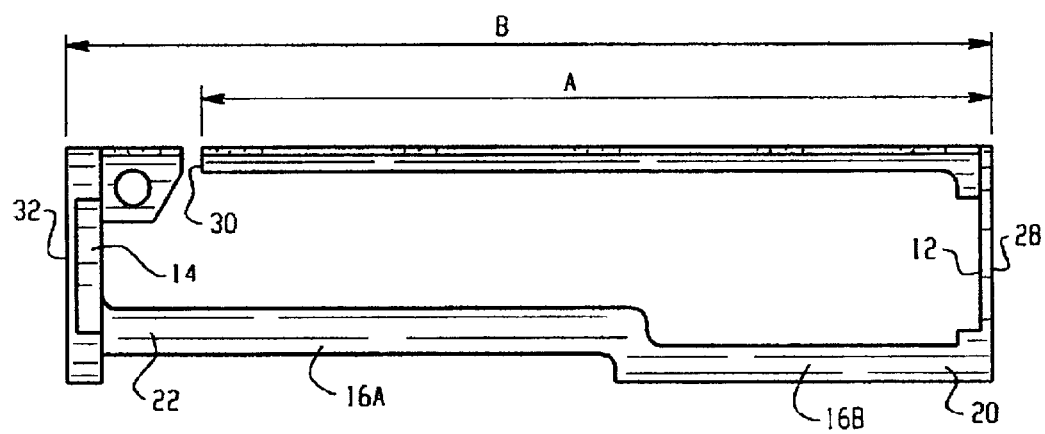
FIG. 4 is a side view of the battery pack frame of FIG. 1.

The second spine portion 18 provides a support structure for the battery pack frame 10. It is therefore preferred that the length of second spine portion 18 be at least as great as fifty percent of the total length of the frame. Even more preferred, the length of the second spine portion 18 is at least as great as seventy-five percent of the total length of the frame. The length of the second spine portion 18 is the dimension A as shown in FIG. 4. This dimension A is the distance between the exterior surface 28 of the first endcap portion 12 and the surface 30 of free end 26. The length of the frame 10 is the dimension B as shown in FIG. 4. This dimension B is the distance between the exterior surface 28 of the first endcap portion 12 and the exterior surface 32 of the second endcap portion 14.

In a preferred embodiment, a cell assembly with two cells connected in series is inserted into the frame 10. In this embodiment, the interior of first endcap portion 12 (FIG. 2) preferably includes a slot 34 within at least one of the cell receiving areas. The slot 34 accommodates the external cell terminal protrusion (typically the positive terminal) and also functions as a guide for any cell-to-cell tabbing that may be required as a result of the power and performance requirements for the battery pack. In a preferred embodiment, a tab is welded to the positive external cell terminal protrusion of one cylindrical cell and the negative external cell terminal of a second cylindrical cell to make a cell assembly with a series connection; the cell assembly is then inserted into the cell receiving area of the frame and the welded positive terminal protrusion is positioned within the slot 34 of the endcap portion 12 of frame 10. The endcap portion 12 where the cell tabbing is located optionally includes an opening 36 defined by the slot structure. The opening 36 forms a venting path to the exterior of frame 10 and also provides a release point to separate the frame from the mold during manufacture of the frame 10.

Second endcap portion 14 (FIG. 3) includes terminal openings 38A, 38B to expose the cell contacts that form the battery pack contacts, thereby providing electrical contact to the device terminals. In the battery pack of the within invention, there are no discrete pack terminals that must be joined or otherwise added to the pack to contact the device terminals. Rather, the terminals of the cells that are housed within the pack form the battery pack terminals and come into direct contact with the device terminals. In the preferred embodiment described above, the untabbed positive terminal protrusion of one of the series-connected cells is positioned so as to be exposed through opening 38A of second endcap portion 14, while the untabbed negative terminal of the other cell is positioned so as to be exposed through opening 38B. In the preferred embodiment, at least a portion of the perimeter of opening 38A is reinforced with a stabilizing support structure 40 having a centralized opening exposing the positive cell terminal protrusion. Support structure 40 can optionally include a gap 42. Gap 42 forms a venting path to the exterior of frame 10 and also provides a release point to separate the frame from the mold during manufacture of the frame 10.

The frame is preferably injection molded from a thermoplastic resin. Suitable thermoplastic resins include ABS resins (acrylonitrile, butadiene and styrene) such as Polylac ABS PA-717C and Polylac ABS PA-747 available from Entec Engineered Resins, Maitland, Fla., and Cycolac MG47 available from General Electric Plastics.

Preferably, the thermoplastic resin utilized is a mixture of materials that includes at least one polyolefin and at least one aromatic polymer having a repeating unit with at least one aromatic functional group. The mixture includes more than 30 weight percent polyolefin. Preferably the mixture contains at least 40 weight percent polyolefin.

The polyolefin may be a polymer based on one or a combination of the following monomers: ethylene, propylene, 1-butene, 1-pentene, 1-hexene, 1-heptene, 1-octene, 1-decene, 1-octadecene, 3-methyl-1-butene, 3-methyl-1-pentene, 4-methyl-1-pentene, 4methyl-1-hexene, 5-methyl-1-hexene, 5-methyl-1-heptene, vinylcyclohexane and vinylnaphthalene. Preferred polyolefins are polypropylene, polyethylene and polypropylene-ethylene copolymer, with polypropylene being most preferred.

The mixture comprises discrete phases of the aromatic polymer in a matrix of the polyolefin, as can be observed with the aid of transition electron microscopy (TEM).

An aromatic polymer is a polymer with a repeating unit that contains one or more types of aromatic functional groups. Examples of aromatic polymers that are suitable for use in the invention include poly(phenylene oxides), which have monomers such as 2,6-dimethyl-1,4-phenylene ether and 2,3,6-trimethyl-1,4-phenylene ether; aramids; polyketones, such as poly(ether ether ketone), poly(ether ketone), poly(ether ketone ketone) and poly(arylether ketone); polysulfones, such as polyether sulfones and polyaryl sulfones; polystyrenes, such as atactic polystyrene and syndiotactic polystyrene; polybenzimidazoles; polyimides; polybenzoxazinones; polybenzothiazoles; polybenzoxazoles; polybenzimidazoles; polyarylates; polyamideimides; polyetheridmides; polyphenylene sulfides; polyphenyls; polyquinolines; and polyquinoxalines. Poly(phenylene oxides) are preferred aromatic polymers.

The thermoplastic material of the invention may optionally include a compatibilizer. A compatibilizer is a material that ties the polyolefin and aromatic polymer phases together to maintain the size, shape, and distribution of the dispersed aromatic polymer in the polyolefin after injection molding of the seal member and throughout the useful life of the seal member and the cell in which it is used. Block copolymers are preferred compatibilizers. One end of a block is soluble in the polyolefin, and another end of a block is soluble in the aromatic polymer.

In the preferred embodiment, the polyolefin is polypropylene and the aromatic polymer is polyphenylene oxide, such as is described in co-pending U.S. application Ser. No. 09/033830, hereby incorporated herein by reference as if fully re-written. One such polyphenylene oxide/polypropylene blend is Noryl PPX 7110, available from General Electric Plastics.

Figure 5:
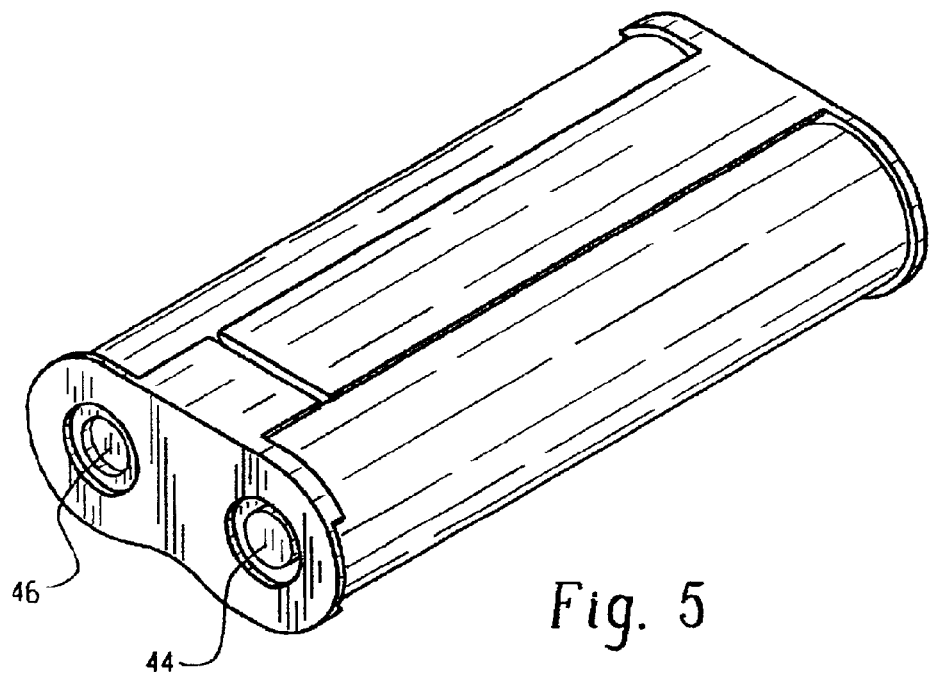
FIG. 5 is a perspective view of the battery pack frame of FIG. 1 with two cylindrical cells inserted into the frame.

Once the battery pack frame 10 has been molded, cells can be inserted into the frame. Cell preparation prior to insertion into the frame can include shrink wrapping the cells individually, tabbing the cells together, providing any additional tabbing required to provide battery pack external contacts at the desired position in or on the pack, and joining the cells together using a suitable adhesive as is known in the art. Once the cells have been prepared as desired, they can be inserted into the battery pack frame 10 by flexing the free end 26 of spine portion 18 toward or away from the interior of the frame, to create an opening sufficient to insert the cells into the frame. Alternately, or in addition to flexing the free end 26 of spine portion 18, second endcap portion 14 can be flexed away from the interior of the frame, to create an opening for the insertion of cells into the frame. FIG. 5 shows two cylindrical cells that have been inserted into frame 10. The positive protrusion 44 of one cell is exposed through opening 38A of second endcap portion 14 while the negative contact 46 of the second cell is exposed through opening 38B of second endcap portion 14. It will be appreciated by one of skill in the art that the frame 10 can be utilized with discrete cells that are not interconnected as well as with cells that are connected in series or in parallel without departing from the scope of the within invention.

Figure 6:
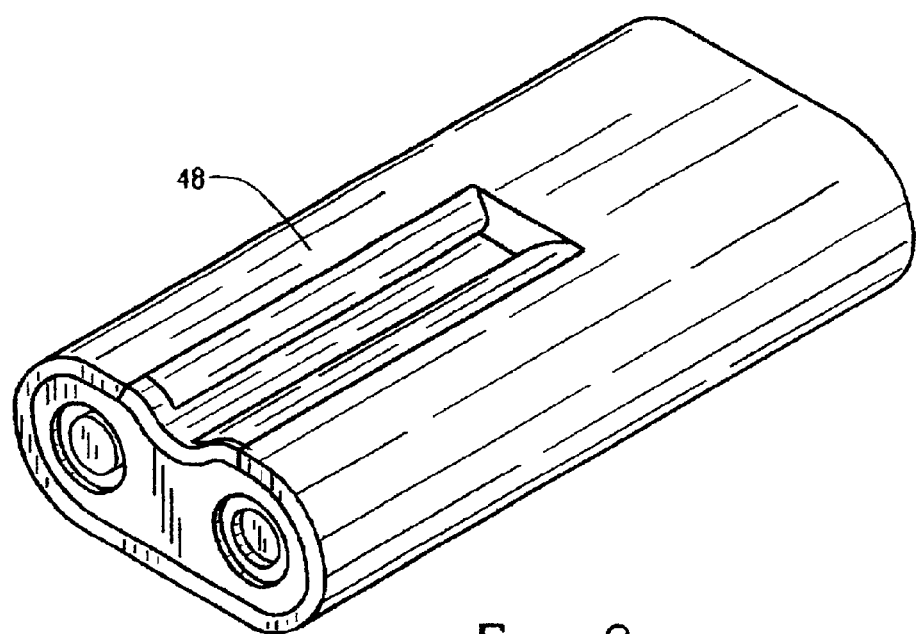
FIG. 6 is a perspective view of the battery pack frame of FIG. 5 with a label.

Optionally, the integrity of the pack can be improved by the application of an adhesive label about the exterior of the exposed cell surfaces and the exposed surfaces of the frame. FIG. 6 shows the battery pack of the within invention with the inclusion of an adhesive label 48 as is known in the art. The label also provides a surface available for the communication of information concerning the battery pack and its use.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A battery pack comprising a plurality of electrochemical cells and a battery receiving frame, said cells comprising external cell contact terminals, said flame comprising a first endcap portion, a second endcap portion, a first spine portion and a second spine portion, wherein said frame is a single integral part, said first wine portion has a first end connected to said first end cap portion and a second end connected to said second endcap portion and said first spine portion comprises two sections, each of the two sections having an external surface elevation different from the other.

2. The battery pack of claim 1, wherein said second spine portion has a first end connected to said first endcap portion and a second end that is free.

3. The battery pack of claim 1, wherein said second endcap portion further comprises at least one opening exposing at least one of the cell contact terminals to the exterior of the pack.

4. The battery pack of claim 1 wherein said first endcap portion further comprises at least one opening exposing at least one of the cell contact terminals to the exterior of the pack.

5. The battery pack of claim 1, wherein said second spine portion has a length between said first and second ends that is at least as great as half of the total length of the frame.

6. The battery pack of claim 3, wherein said second spine portion has a length between said first and second ends that is at least as great as half of the total length of the frame.

7. The battery pack of claim 4, wherein said second spine portion has a length between said first and second ends that is at least as peat as half of the total length of the frame.

8. The battery pack of claim 1, wherein said cells are cylindrical cells and at least two of said cells are connected in series.

9. The battery pack of claim 8, wherein said cells are standard size AA cells.

10. The battery pack of claim 8, wherein said cells comprise metallic lithium as the anode active material and iron pyrite as the cathode active material.

11. The battery pack of claim 1, wherein said frame comprises an injection-molded thermoplastic material, the thermoplastic material comprising a mixture of:

a polyolefin matrix comprising more than 30 weight percent of the thermoplastic material; and an aromatic polymer having a repeating unit that comprises at least one aromatic functional group.

12. The battery pack of claim 11, wherein the polyolefin is at least one polymer selected from the group consisting of a polypropylene, a polyethylene, and a polypropylene-ethylene copolymer.

13. The battery pack of claim 12, wherein the aromatic polymer is at least one polymer selected from the group consisting of poly(phenylene oxides), aramids, polyketones, polysulfones, polystyrenes, polybenzimidazoles, polyimides, polybenzoxazinones, polybenzothiazoles, polybenzoxazoles, polybenzimidazoles, polyarylates, polyamido-imides, polyetherimides, polyphenylene sulfides, polyphenyls, polyquinolines and polyquinoxalines.

14. The battery pack of claim 13, wherein the aromatic polymer is a poly(phenylene oxide).

15. The battery pack of claim 14, wherein the polyolefin is a polypropylene.

16. The battery puck of claim 1, wherein each of the endcap portion has an external surface with opposing rounded ends and a straight side between the rounded ends, and the second spine portion has a flat external surface on a common plane with the straight sides of the endcap portions.

17. A method of assembling a battery pack, comprising the steps of:

providing a one-piece battery pack frame comprising first and second spine portions and first and second endcap portion; wherein a first end of said first spine portion is connected to said first endcap portion, a second end of said first spine portion is connected to said second endcap portion, said first spine portion comprises two sections, each of the two sections having an external surface elevation different from the other, and an end of said second spine portion is free;

providing at least two electrochemical cal cells; and inserting said cells into said frame.

18. The method of claim 17, further including the steps of creating a connection between said cells prior to inserting said cells into said frame and flexing said free end to create an opening sufficient to insert said cells into said frame.

19. The method of claim 18, wherein said connection is created by welding a nickel tab to the positive terminal of one cell and the negative terminal of another cell.

20. The method of claim 17, further including the step of applying a shrink wrap to said cells prior to inserting said cells into said frame.

21. The method of claim 17, further including the step of applying an adhesive label to portions of the external surfaces of said frame and to portions of the exposed external surfaces of said cells.

* * * * *